United States Patent [19]

Traut

[11] 3,998,506
[45] Dec. 21, 1976

[54] TOOTHED ROLLING CONTACT DEVICES
[76] Inventor: Earl W. Traut, P.O. Box 23776, Fort Lauderdale, Fla. 33307
[22] Filed: Jan. 30, 1974
[21] Appl. No.: 437,937
[52] U.S. Cl. .............................. 308/205; 308/206
[51] Int. Cl.² ................... F16C 13/00; F16C 33/00
[58] Field of Search ........... 308/205, 206, 200, 179

[56] References Cited
UNITED STATES PATENTS

| | | | |
|---|---|---|---|
| 574,958 | 1/1897 | Spencer | 308/205 |
| 1,222,534 | 4/1917 | Cormier | 308/205 |
| 1,381,811 | 6/1921 | Denton | 308/205 |
| 2,325,099 | 7/1943 | Best | 308/205 |

Primary Examiner—Philip Goodman
Assistant Examiner—Richard A. Bertsch

[57] ABSTRACT

Radial and axial load bearing devices in which loads are transferred from a race through rollers to a second race or other rollers, the rollers and races having projections which fit into recesses in the other, thus providing separation between the rollers and also avoiding sliding friction. In some of these devices the projections and recesses are composed of gear teeth thus enabling them to transfer torque loads, others are capable of speed or directional changes, and yet others provide minimum friction crank and shaft combinations with variable speed ratios.

5 Claims, 14 Drawing Figures

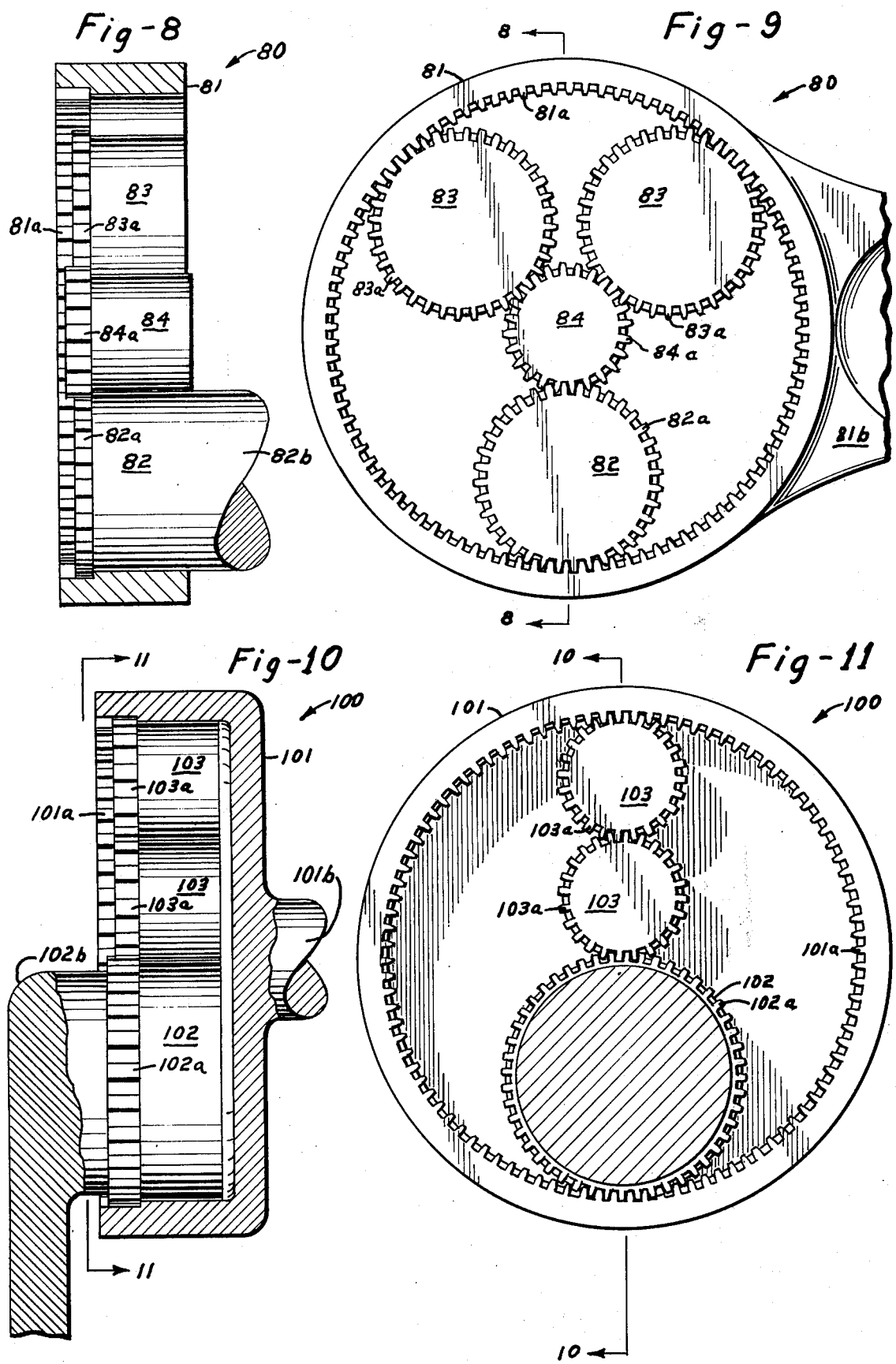

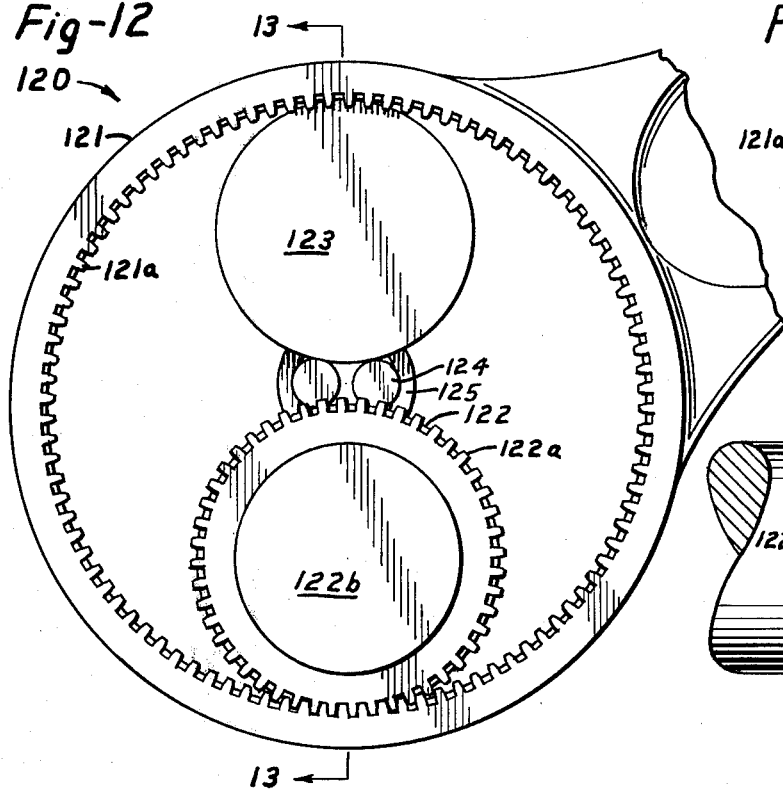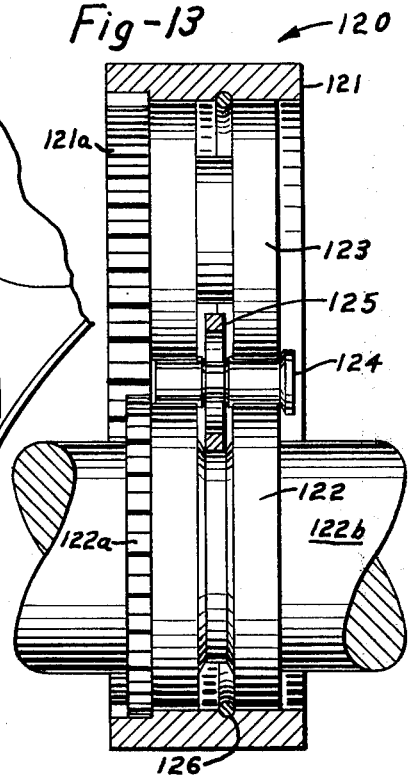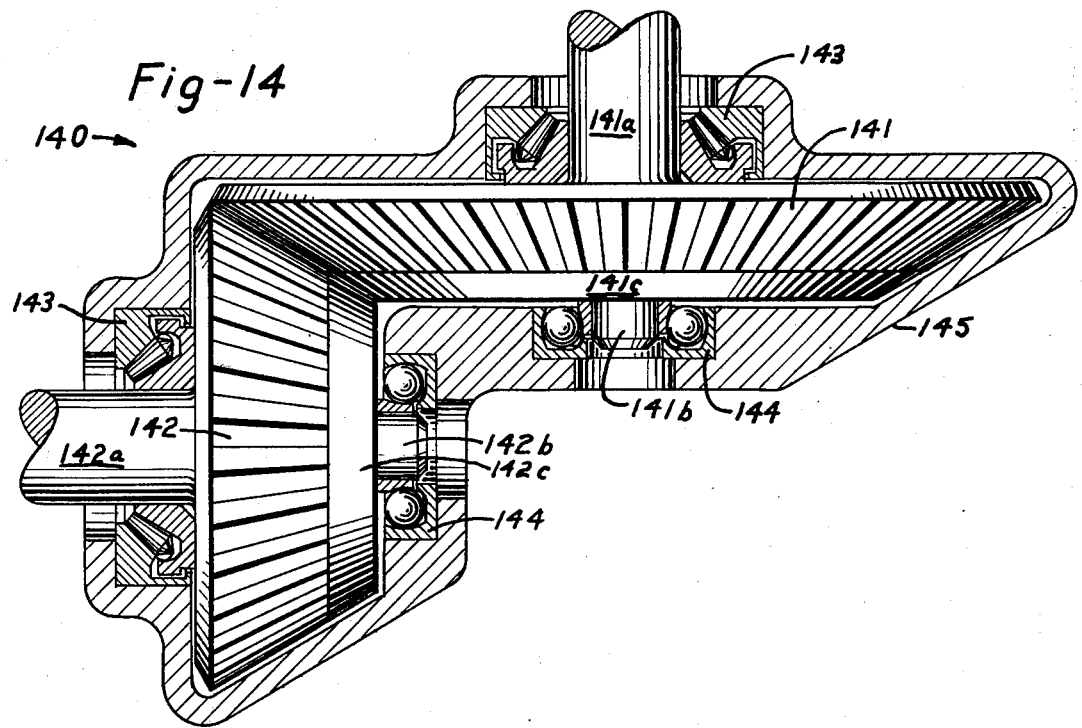

TOOTHED ROLLING CONTACT DEVICES

BACKGROUND OF THE INVENTION

In typical roller bearings and similar devices which support rotating elements, there is sliding friction between rotating elements, cages, or supporting components. This sliding friction is undesireable in that it causes heat, wear, and the necessity for providing lubrication. Although other types of rolling contact bearings have been devised, they are often complex, include components rotating at high speeds, or must be constructed to very close tolerances.

SUMMARY OF THE INVENTION

The invention provides axial and radial load rolling contact bearing devices which are capable of supporting rotating components with a minimum of friction. The simpler versions comprise two bearing races with interposed rollers, the races having projections which mate with recesses in the rollers, or vice versa. These projections and recesses keep the rollers separated and in the same position relative to each other, thus precluding sliding contact between them. The projections and recesses can have simple shapes which assure their engagement at the lines of rolling contact only, thus also excluding sliding friction at these locations. As few positioning means as one projection per race and one recess per roller, or vice versa, will assure separation between the rollers. In devices which include torque loads, gear teeth may be used instead of simple projections and recesses.

In some embodiments of the devices additional races and rollers of different sizes provide coaxial speed change capability thereto.

In other embodiments radial loads are transferred through geared rings to internal roller and gear combinations, so as to provide reciprocating crank and rotating shaft combinations. In these embodiments the crank may be connected to the ring and the shaft attached to one of the internal roller-gears, or the crank may be connected to an internal roller-gear and the shaft connected through a coaxial cup-shaped element to the ring. In all of these embodiments, the radial loads are transferred between crank and shaft through rolling line contacts, whereas the torque loads are transferred through the gear teeth; the only sliding friction thus being in the meshing of the gear teeth. Various speed combinations between crank and shaft are possible, such as one rotation of the shaft for every two complete reciprocations of the crank.

In still other embodiments, directional change between rotating shafts may be obtained by utilizing bevel gears which are held in position by rolling contact surfaces adjacent their pitch lines and by rolling contact bearings mounted in the support housing; again avoiding sliding friction except in the gear teeth.

Accordingly, it is an object of the present invention to provide an improved rolling contact bearing which avoids sliding friction.

Another object of the invention is to provide a rolling contact bearing wherein there are zero clearances between components, thus providing for exact centering of rotating elements with zero displacement due to clearances.

A further object of the invention is to provide a rolling contact device wherein infinitely small to infinitely large speed ratios may be obtained.

Yet another object of the invention is to provide oscillatory or crank motion between elements whose loads normal to their lines of contact are transferred in rolling contact only and whose tangential or torque loads are transferred through gear teeth.

A still further object of the invention is to provide different speed ratios between a crank and its associated shaft.

Other objects of this invention will appear from the following description and appended claims, reference being had to the accompanying drawings forming a part of this specification wherein like reference characters designate corresponding parts in the several views.

FIG. 8 is a vertical sectional view of a geared rolling contact crank and shaft assembly, taken along line 8—8 of FIG. 9 and looking in the direction of the arrows.

FIG. 9 is a face view of the device of FIG. 8.

FIG. 10 is a vertical sectional view of a geared rolling contact crank and shaft assembly similar to that of FIGS. 8 and 9, taken along line 10—10 of FIG. 11 and looking in the direction of the arrows.

FIG. 11 is a face view of the device of FIG. 10.

FIG. 12 is a face view of another rolling contact crank similar to that of FIGS. 10 and 11 but utilizing a different arrangement of rollers.

FIG. 13 is a vertical sectional view taken along line 13—13 of FIG. 12 and looking in the direction of the arrows.

FIG. 14 is a vertical sectional view of a pair of meshed rolling contact bevel gears and their support means.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Figure 1:
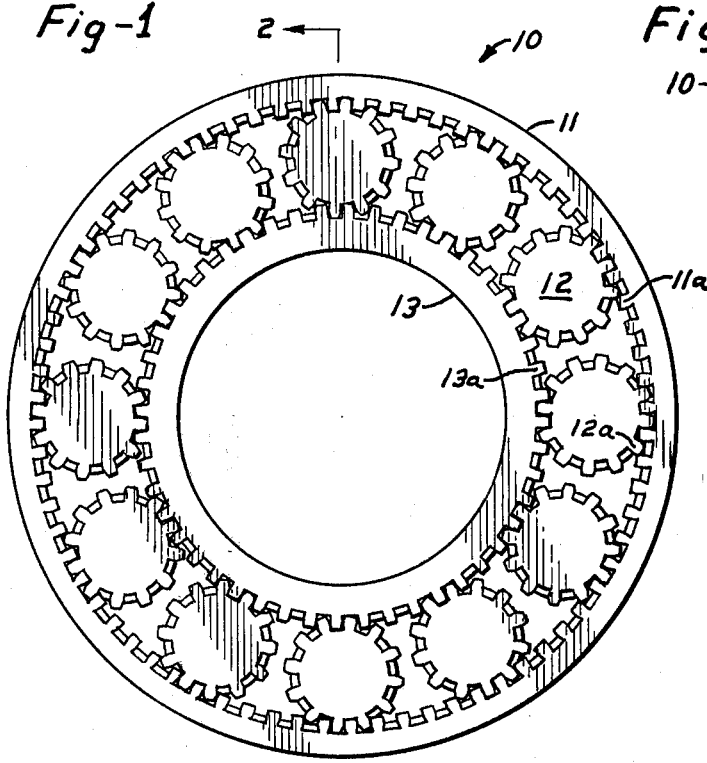
FIG. 1 is a face view of a radial load rolling contact bearing which utilizes gears to provide separation between its rollers.
Figure 2:
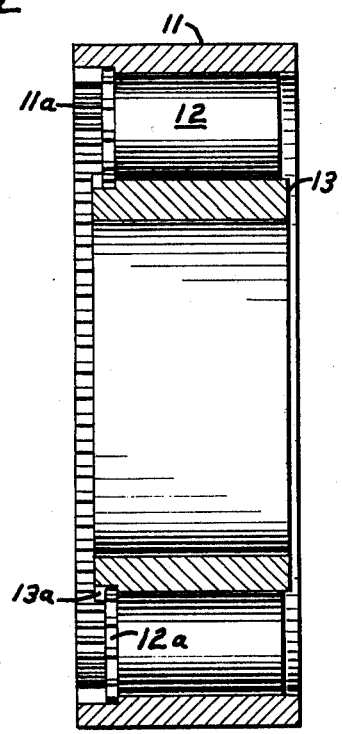
FIG. 2 is a vertical sectional view taken along line 2—2 of FIG. 1 and looking in the direction of the arrows.

Turning now to FIGS. 1 and 2, there will be seen device 10 which is a radial load rolling contact roller bearing in which gear teeth are used to hold the rollers in a fixed position with respect to each other. Outer race 11 transfers loads through rotating rollers 12 to inner race 13. Gear 11a is integral with or otherwise affixed to outer race 11 and meshes with gears 12a which are affixed to or integral with rollers 12. Gears 12a mesh with gear 13a which is joined to inner race 13. Thus it can be seen that rollers 12 are prevented from contacting each other by gears 11a, 12a and 13a. It should be noted that the lines of contact of the rotating elements are aligned with the pitch circles of their respective gears and that they are thus interlocked and unable to shift axially with respect to each other.

Figure 3:
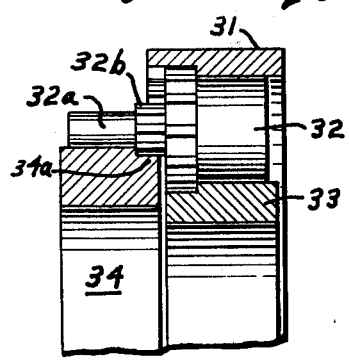
FIG. 3 is a vertical sectional view of the upper portion of a radial load rolling contact bearing which additionally provides speed changes.

FIG. 3 shows device 30 which is a radial load rolling contact speedchange device similar to device 10, except that each roller has an axial extension and an additional gear of a different size, the additional gears and extensions being in contact with a third geared race which rotates at a speed different from that of either of the other races. In device 30, geared outer race 31 is meshed in rolling contact with geared rollers 32, which in turn are meshed in rolling contact with geared inner race 33, just as in device 10. Additionally, each roller 32 has a terete axial extension 32a which is in rolling contact with a third race 34. Gears 32b are integral with axial extension 32a and mesh with gear 34a which is at the edge of race 34.

It should be noted that in device 30 the gears not only provide separation between the rollers, but may also be used to transfer torque between any combination of the races. Also note that all radial loads are transferred through the lines of rolling contact between the elements. Please note too that the races all have the same axis of rotation.

If outer race 31 is held stationary during operation of device 30, race 33 will rotate about three times as fast as race 34 because the diameter of roller 32a is about one third as large as the diameter of roller 32. If the diameter of roller 32a is increased, the speed difference between races 33 and 34 decreases, becoming zero when the diameters of rollers 32 and 32a are equal. However, if race 33 is held stationary and race 34 is used as the driving member, race 31 will rotate. And as the diameter of roller 32a increases the speed of race 31 will increase, theoretically to infinity when rollers 32 and 32a reach the same diameter. Actually, of course, rotation could not occur in this latter event.

Though not included in FIG. 3, a retaining ring could be provided radially outwards of axial extensions 32a to hold them against race 34. Such a retaining ring could also have a geared edge meshing with gear 32b and could thus provide a fourth speed. In another variation of this device geared axial extensions 32a would have a larger diameter than geared rollers 32 and would thus provide a different speed relationship.

Figure 4:
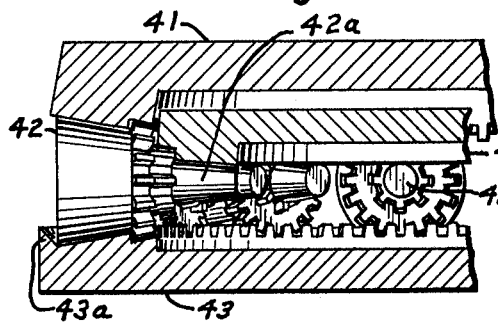
FIG. 4 is a vertical sectional view of the left portion of an axial load rolling contact bearing which utilizes gears to provide separation between its rollers and which also provides speed changes.

FIG. 4 depicts device 40 which is similar to device 30 except that it is an axial load rather than a radial load device. In device 40, geared upper race 41 transfers axial loads through geared rollers 42 to geared lower race 43. Rollers 42 are truncated cones whose apex, if extended, would coincide with the axis of the device, thus assuring rolling line contact and no sliding friction between the axial load bearing elements. Lower race 43 has a circular lip 43a which prevents radially outward movement of rollers 42. Rollers 42 each have a radially inward geared axial extension 42a which is in rolling contact with geared race 44. Though not shown in FIG. 4, either upper race 41 or lower race 43 would be open centrally to provide a means of access to race 44, which rotates at a different angular velocity than either races 41 or 43. Operation of device 40 is comparable to operation of device 30 and speed differentials ranging from zero to theoretically infinity are similarly available.

Many variations of device 40 are possible. For instance, the gears of each roller could be at opposite ends of each roller instead of adjacent to each other. Or, geared axial extensions 42a could extend radially outwards instead of inwards. Or, geared axial extensions 42a could have a greater diameter than rollers 42.

Further variations of device 40 would include devices intermediate to it and device 30, such devices having both radial and axial load bearing capabilities and being additionally capable of transferring torque and simultaneously providing coaxial speed changes.

Figure 5:
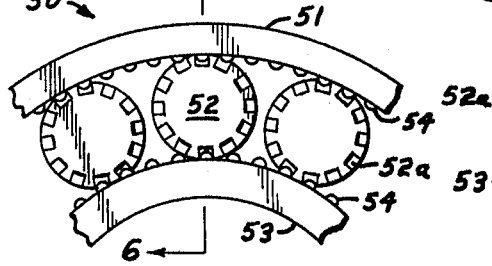
FIG. 5 is a face view of a radial load rolling contact bearing which utilizes projections on its races engaging with slots in its rollers to provide separation between its rollers.
Figure 6:
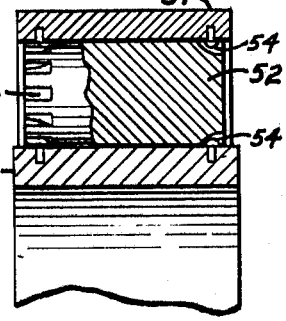
FIG. 6 is a vertical sectional view taken along line 6—6 of FIG. 5 and looking in the direction of the arrows.

FIGS. 5 and 6 depict device 50 which is a radial load rolling contact device similar to device 10 except that projections and slots are used instead of gear teeth to maintain separation between the rollers, the main advantage being the the gear teeth of FIG. 10 are in sliding contact whereas the projections and slots of device 50 involve no sliding friction. In device 50, radial loads are transferred through rolling line contacts between outer race 51, rollers 52 and inner race 53. Rounded projections 54 affixed to outer race 51 and inner race 53 engage slots 52a in the ends of rollers 52 to keep them at the same distance from each other. Any contact between projections 54 and slots 52a is ideally at the lines of rolling contact between the load bearing elements and thus there is no sliding friction at these contacts or anywhere else in the device. Milled slots 52a are depicted, but round holes or other indentations could also be used. Also, the projections could be mounted on rollers 52, with the slots or holes then being located in races 51 and 53. Almost any convenient shape of projection and hole may be used, provided their only contact is at the line of rolling contact of the load bearing elements.

Figure 7:
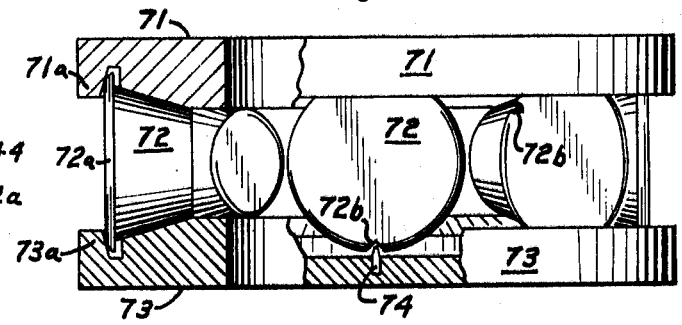
FIG. 7 is a side view of an axial load rolling contact bearing whose left end is vertically sectioned and whose forward lip is removed so as to reveal a positioning pin and notched roller which demonstrate the means of providing separation between the rollers.

FIG. 7 represents device 70, which is similar to device 50 except that the device 70 is an axial rather than a radial load bearing and that in device 70 a minimum number of projections and slots are used to provide separation between the rotating elements. Device 70 also resembles device 40 but differs from it in the means of preventing radially outward movement of the rollers and in the means of assuring separation between the rollers.

Returning now to FIG. 7, it will be seen that upper race 71 is in rolling contact with conical rollers 72, which in turn are in rolling contact with lower race 73. A circular lip 72a on the radially outward end of each roller 72 is in rolling point contact with circular flange 73a of lower race 73. These points of rolling contact are continually aligned with the lines of contact between rollers 72 and race 73, there thus being no sliding friction thereat. Circular lips 72a are also in rolling point contact with circular flange 71a of upper race 71. Each roller 72 has a notch 72b which rolls over a pin 74 affixed to lower race 73 and over another pin 74 affixed to upper race 71, the upper pin not being shown in the figure. Upper and lower races 71 and 73 may be identical as shown. After assembly of device 70, rollers 72 must be positioned so that their notches will engage pins 74. Continuous contact must be maintained between the races and the rollers to prevent their displacement. The ratio of the diameter of either race to the diameter of the roller at any point of contact must be an integer to assure engagement of pins and notches during continuous rotation; or, additional notches and/or pins may be provided.

In a variation of device 70, pin 74 would be moved onto the circular race surfaces of races 71 and 73, and each roller 72 would have a single hole to engage pins 73. As mentioned in conjunction with device 50, the shape of these holes and projections may be quite varied. Also, the projections could be located on the rollers instead of the races, with the holes then being located in the races.

FIGS. 8 and 9 show device 80 which is a geared rolling contact crank and shaft combination. Ring 81 is an integral part of crank 81b and reciprocates with it. Rollers 82 and 83 have the same diameter and are in rolling contact with the inner periphery of ring 81 and also with centrally located idler roller 84. Ring 81 has internal gear 81a affixed to or integral with one of its sides. Rollers 82, 83, and 84 have gears 82a, 83a and 84a respectively affixed to or integral with one side. Gears 81a, 82a, 83a and 84a mesh with each other as shown and thereby serve to continually hold rollers 82, 83 and 84 in the same position relative to each other. Geared rollers 82 and 83 are shown as unequally spaced in a circle around roller 84, but they could just as well be equally spaced.

During operation of device 80, crank 81b reciprocates and thereby causes geared ring 81 to oscillate around geared roller 82, causing it to rotate. Shaft 82b is mounted in suitable bearings which permit it to rotate about its own axis. Conversely, rotation of shaft 82b may be used to cause reciprocating action of crank 81b. In either configuration geared rollers 82, 83 and 84 maintain their same relative position within geared ring 81. It should be noted that all radial loads within the device are transmitted in rolling contact between ring 81 and rollers 82, 83 and 84; whereas all torque loads upon the rotating elements are transferred through bending stress upon the teeth of gears 81a, 82a, 83a, and 84a.

In a variation of this device, rollers 82 and 83 would be of different sizes, with roller 84 thus not being in the center ring 81. But this would result in a device where bending stress is placed upon the teeth of gears 81a, 83a and 84a simply to hold them in position.

A series of devices 80 with a common shaft such as 82b passing through all of them could be used in an in-line pump or engine device.

FIGS. 10 and 11 depict device 100 which is a geared rolling contact crank and shaft assembly similar to that of device 80, except that the crank is attached to one of the rollers instead of to the ring and there are three differently positioned rollers instead of four. Looking now at FIGS. 10 and 11, there will be seen outer ring 101 in rolling contact with roller 102 and with one of the rollers 103. The second, or central, roller 103 is in rolling contact with roller 102 and with the first mentioned roller 103. Gears 101a, 102a, and 103a are affixed to or integral with elements 101, 102 and 103 respectively and serve to hold them in the same relative position with respect to each other during rotation. Ring 101 is integral at one end through a cup-shaped extension with shaft 101b and rotates about the axis thereof, shaft 101b being mounted in suitable bearings. Crank 102b is affixed to or integral with gear 102a and roller 102. Reciprocation of crank 102b will cause rotation of shaft 101b or vice versa, with radial loads being transferred through the rolling line contacts between elements 101, 102 and 103. Torque loads are transferred through the teeth of gears 101a, 102a and 103a.

Although shown as being the same size, the two rollers 103 could be of different sizes, and a more stable combination results if the radially outward roller 103 is the larger of the two. Please note that roller 102 is shown as having half the diameter of ring 101. Thus, it requires two complete reciprocating cycles of crank 102b to produce one rotation of shaft 101b. This permits device 100 to use very simple ignition and valving arrangements if used in four-cycle reciprocating engines.

FIGS. 12 and 13 depict device 120 which is another geared rolling contact crank and shaft combination wherein only two of the elements require gear teeth. Crank ring 121 has roller 122 in rolling contact with its inner periphery. Gears 121a and 122a are affixed to or integral with crank ring 121 and roller 122 respectively and serve to transfer torque loads therebetween. Shaft 122b is affixed to or integral with roller 122 and is suitably mounted in bearings so as to permit it to rotate about its own axis. Roller 123 is in rolling contact with the inner periphery of crank ring 121, but on the opposite side thereof from roller 122. Radially inward action of the two rollers 124 holds rollers 122 and 123 radially outwards against crank ring 121. The inner periphery of ring 125 contacts rollers 124 on their central grooves and serves to hold them radially inwards against rollers 122 and 123. Rollers 122 and 123 have circular grooves to accommodate ring 125. Contact between ring 125 and the central hub of either roller 122 or 123 is not necessary for operation of the device but will add to its strength and stability. Therefore the outer periphery of ring 125 is shown as being in rolling contact with the central hub of roller 122. There will be no sliding contact between any of the rolling line contacts if dimensions are according to the following formula:

$$\frac{122_L}{122_S} = \frac{124_L}{124_S} \times \frac{125_i}{125_o};$$

where $122_L$ = diameter of roller 122 where it contacts rollers 124, $122_S$ = diameter of the central hub of roller 122 where it contacts the outer periphery of ring 125, $124_L$ = diameter of rollers 124 where they contact roller 122, $124_S$ = diameter of the central hubs of rollers 124 where they contact the inner periphery of ring 125, $125_i$ = inner diameter of ring 125, $125_o$ = outer diameter of ring 125.

The meshing of gears 121a and 122a prevents axial displacement of roller 122 with respect to crank ring 121. The central hubs of rollers 122 and 124 have the same width as ring 125 where they contact it, thus precluding axial movement of these elements with respect to each other. Although gear teeth 121a would prevent roller 123 from moving to the left in FIG. 13, snap ring 126 is provided to assure minimal clearance thereat. Also in FIG. 13, the right end of rollers 124 is shown with a head which serves to prevent movement of roller 123 to the right; however this could also be accomplished by using another snap ring 126 on the right edge of roller 123 mounted in an internal groove in ring 121 thereat.

In a variation of device 120, instead of having gears 121a and 122a located on only one side of ring 121 and roller 122, an additional set of gears 121a and 122a could be added on the other side as to move evenly distribute torque loads. Such an arrangement would also be useful in applications where the torque loads are relatively high.

Another variation of device 120 would give it similarity to device 100 in that the crank would be affixed to roller 122 and the ring 121 would have a coaxial cup-shaped extension and shaft. Device 120 would then have geared ring 121 rotating about a central axis once for every two complete oscillations or reciprocations of geared crank roller 122, thus providing the aforementioned advantages if used in four-cycle engines.

It should be noted that although ring 125 is shown as being located radially inwards of rollers 122 and 123, configurations of device 120 are possible wherein ring 125 would be considerably larger and would pass through the groove in rollers 122 or 123 radially outwards of their central axes. Also, instead of using only one ring 125 rotating within the grooves of rollers 122 and 123, rollers 124 could be extended axially so that two rings 125 could be utilized, one on each side of rollers 122 and 123.

The devices shown thus far have particularly been bearings, some including a torque transferring capability or a cranking ability. This invention is also suited to devices whose principal purposes are to transfer torque, change speed, or change direction. Devices 30 and 40 could serve primarily to transfer torque and change speeds simply by widening the gears and narrowing the rolling contact surfaces.

Device 140 has as its primary purposes transferring torque loads between two rotating shafts which are non-parallel and at the same time changing speed of rotation. Bevel gear 141 rotates enmeshed with bevel gear 142. Conical rolling contact surfaces 141c and 142c are aligned with the pitch lines of their respective gears and serve in conjunction with rolling contact bearings 143 and 144 to support the gears. Shafts 141a, 141b, 142a and 142b are mounted in bearings 143 and 144 which are installed in housing 145, which would actually be composed of several parts to accommodate assembly of the various elements and to provide access thereto.

The advantages of having surfaces 141c and 142c in rolling contact become more apparent if their use in a typical automobile differential is considered. In the rotating assembly inside such differential an additional bevel gear 142 would mesh with the right end of gear 141, and an additional bevel gear 141 would mesh with the bottoms of the then two gears 142. Inward pressure upon all four gears by rolling contact bearings would then press rolling contact surfaces 141c and 142c against each other so as to maintain the correct separation between the gears. Only rolling contact would be present, except between the bear teeth. The stationary portion of such a differential would include a pinion such as gear 142 and a main drive gear such as gear 141 plus an additional set of conical surfaces 141c and 142c oriented rectangularly and having inward pressure to hold them against each other by rolling contact bearings, thus to efficiently support such pinion and drive gear and maintain the correct clearance therebetween.

I claim:
1. A geared rolling contact crank mechanism comprising:
    a ring-shaped bearing race,
    first rotating means,
    said first rotating means including two rotating rollers in rolling contact with the inner periphery of said bearing race,
    second rotating means,
    said second rotating means including two rollers in rolling contact with said first rotating means,
    at least one retaining ring,
    said retaining surrounding said two rollers of said second rotating means and serving to hold same in position against said first rotating means,
    crank means,
    shaft means,
    said bearing race and one roller of said first rotating means having gear teeth affixed to at least one axial end of same,
    so as to prevent sliding contact between said roller having gear teeth affixed to it and said bearing race.

2. The geared rolling contact crank mechanism as claimed in claim 1 in which said shaft means comprises a shaft extending axially from said roller having gear teeth affixed to it, and in which said crank means comprises a crank affixed to and extending radially outwards from the outer periphery of said ring-shaped bearing race.

3. The geared cooling contact crank mechanism as claimed in claim 1 in which said shaft means comprises a shaft coaxial with said ring-shaped bearing race which is affixed thereto by a cup-shaped extension, and in which said crank means comprises a crank joined to one end of said roller having gear teeth affixed to it.

4. The geared rolling contact crank mechanism as claimed in claim 1 in which said roller having gear teeth affixed to it is half the diameter of the inner periphery of said ring-shaped bearing race.

5. The geared rolling contact crank mechanism as claimed in claim 1 in which the lines of rolling contact of said first rotating means and said bearing race are aligned with the pitch circles of their affixed gears, so that radial loads are transferred through said lines of rolling contact and torque loads are transferred through the teeth of said gears, the only sliding friction being in the meshing of said gear teeth.

* * * * *